United States Patent [19]
Oi

[11] Patent Number: 5,762,481
[45] Date of Patent: Jun. 9, 1998

[54] IN-TANK TYPE FUEL PUMP

[75] Inventor: Kiyotoshi Oi, Toyohashi, Japan

[73] Assignee: Nippondenso Co., Ltd., Kariya, Japan

[21] Appl. No.: 620,579

[22] Filed: Mar. 22, 1996

[30] Foreign Application Priority Data

Mar. 23, 1995 [JP] Japan .................................. 7-064388

[51] Int. Cl.⁶ .................................................. F04B 17/00
[52] U.S. Cl. .................................. 417/423.3; 417/423.7; 417/423.14; 439/206
[58] Field of Search .......................... 417/423.3, 423.7, 417/423.14, 430; 439/205, 206, 199

[56] References Cited

U.S. PATENT DOCUMENTS

| | | | |
|---|---|---|---|
| 3,772,636 | 11/1973 | Webb | 339/117 |
| 4,364,355 | 12/1982 | Karino | 123/41.31 |
| 4,534,609 | 8/1985 | White | 339/117 |
| 4,543,914 | 10/1985 | Harris | 123/41.31 |
| 5,013,221 | 5/1991 | Tuckey . | |
| 5,131,822 | 7/1992 | Yamamoto et al. | 417/423.7 |

FOREIGN PATENT DOCUMENTS 3-023359   1/1991   Japan .

*Primary Examiner*—Timothy Thorpe
*Assistant Examiner*—Cheryl J. Tyler
*Attorney, Agent, or Firm*—Cushmand Darby & Cushman IP Group of Pillsbury Madison & Sutro LLP

[57] ABSTRACT

An in-tank type fuel pump prevents electrical connection from terminals corroding by discharging foreign substances such as water, degraded fuel and the like entering its electrical connector unit. A terminal protrudes outwardly from a pump case inside a cylindrical terminal housing formed integrally with a pump cover of the fuel pump. A hole which is different from a terminal inserting hole is formed at a bottom portion of the terminal housing to permit fluid to flow therethrough and to connect the pump housing with the terminal housing. Therefore, since liquid having a large specific gravity such as water, degraded fuel and the like in the electrical connector unit is discharged to the outside of the electric connecter by the fluid injected to an internal portion of the terminal housing, the terminal of the electric connecter unit can be prevented effectively from corroding.

8 Claims, 6 Drawing Sheets

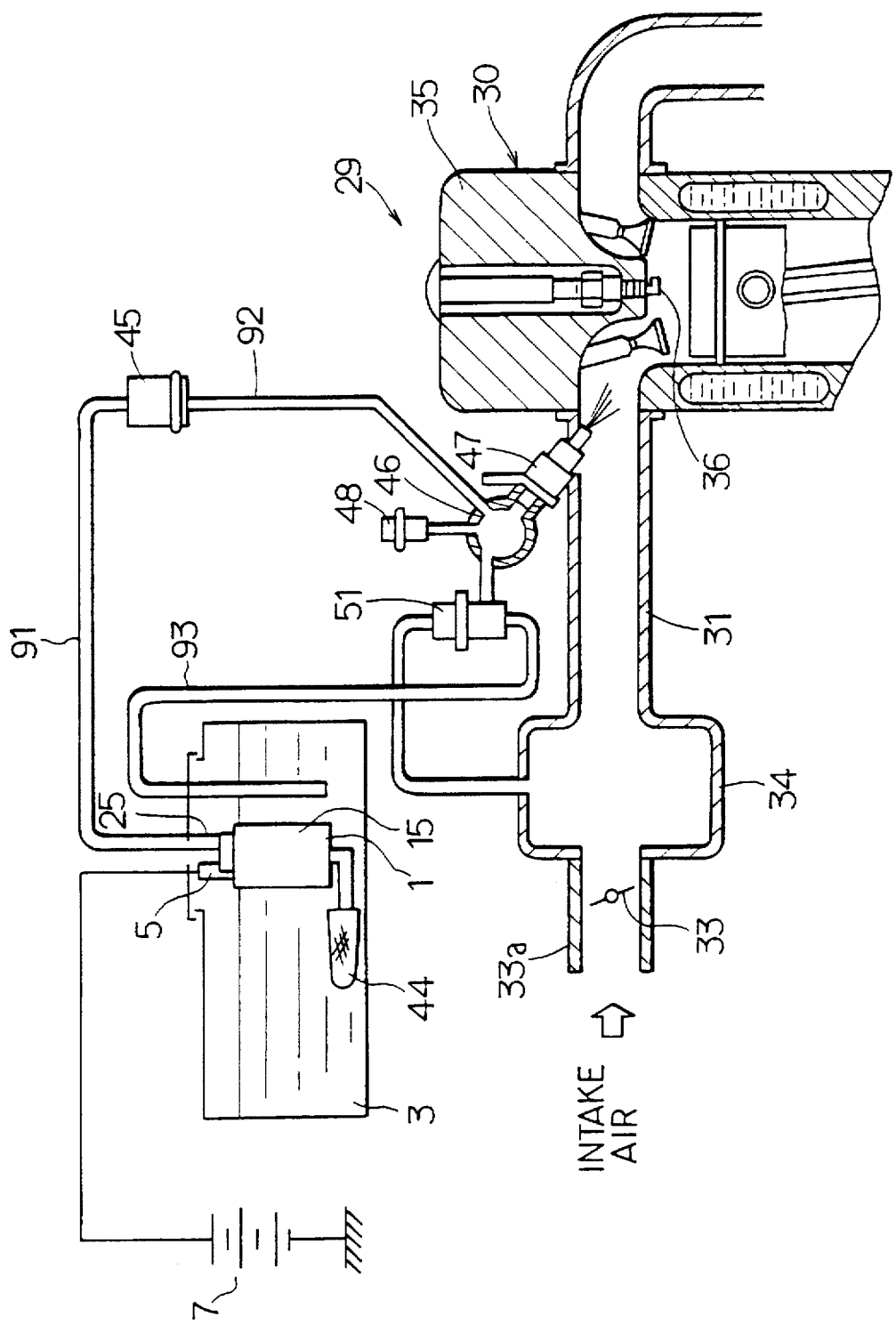

IN-TANK TYPE FUEL PUMP

CROSS REFERENCE TO RELATED APPLICATION

This application is based on and claims priority of Japanese Patent Application No. Hei 7-64388 filed Mar. 23, 1995, the contents of which are incorporated herein by reference.

BACKGROUND OF THE INVENTION

1. Field of the Invention

The present invention relates to a fuel pump for an internal combustion engine.

2. Description of Related Art

Conventionally, in a fuel supply system for an internal combustion engine, a system in which fuel in a fuel tank is pumped up by a fuel pump disposed in the fuel tank and the fuel which is pumped up is discharged under pressure from an outlet through a fuel pipe and is supplied to an engine combustion chamber from a fuel discharging valve through a fuel filter is disclosed.

In the fuel discharged from the fuel pump under pressure, the pressure of the fuel is adjusted by a pressure adjusting valve disposed in the fuel pipe, some of the fuel is supplied to the fuel injection valve, and surplus fuel is returned to the fuel tank from the pressure adjusting valve through a return passage.

In the above-described in-tank type fuel pump disposed in the fuel tank, as disclosed in Japanese Patent Application Laid-Open No. Hei 3-23359, a cylindrical electric connector unit having an open top is disposed at a top portion of a pump casing and can be locked by inserting a power source connector from a side of an electric current supply source into the electric connector unit.

According to the disclosed electric connector unit of the in-tank type fuel pump, as illustrated in FIG. 6, a lock window 107 for locking an engaging claw 105 of a male connector 103 in a power source side is provided at a cylindrical wall 101 of the electric connector unit. However, water, degraded fuel and the like enter from a top portion of the lock window 107 and the cylindrical wall 101 and always stay in the cylindrical wall 101 without being discharged, thereby corroding the connector terminals.

In a fuel pump disclosed in U.S. Pat. No. 5,013,221, a bearing is movably disposed in an axial direction at a concave portion of a central inserting body of an outlet housing of a fuel pump and an end portion of the concave portion is inside the housing and another end portion of the concave portion communicates with the atmosphere through a vent. In the fuel pump, since a cylindrical electric connector unit is not provided, water and degraded fuel do not stay around the terminal. That is, the vent is not for introducing the fuel in the pump portion in the vicinity of the electric connector and not for protecting the terminal from corroding.

SUMMARY OF THE INVENTION

In view of the foregoing problems, it is a throughout primary object of the present invention to provide an in-tank type fuel pump in which water, degraded fuel and the like entering an electric connector unit of the in-tank type fuel pump are discharged assuredly and the connector terminals are prevented from corroding.

An in-tank type fuel pump device includes a fuel pump having an intake port and a outlet port, a pump case, an electrical connector unit having a terminal, a terminal housing disposed around the terminal and a communicating hole connecting an interior of the terminal housing with the outlet port of the fuel pump. When the pump is disposed in a fuel tank and immersed in fuel therein, a portion of fuel discharged from the outlet port flows through the communicating hole into the terminal housing to displace materials disposed therein.

In an in-tank pump according to a first aspect of the present invention, fluid such as water, degraded fuel and the like which is inside the electric connector unit and which has large specific gravity is discharged to an external portion of the electric connector unit by the fuel flowing from the internal portion of the pump to the external portion through an internal space connecting an internal portion of a motor with an internal portion of a terminal housing, thereby preventing the water, degraded fuel and the like from staying inside the terminal housing all the time. Therefore, corrosion of the terminal inside the electric connector unit can be prevented effectively.

In an in-tank fuel pump according to a second aspect of the present invention, since the discharging amount is controlled by the motor portion of the fuel pump corresponding to a demanded fuel amount from the internal combustion engine, the demanded fuel amount of fuel from the internal combustion engine can be appropriately supplied from the fuel pump without retard to the fuel amount flowing to the internal portion of the terminal housing through the internal space from the internal portion of the fuel pump.

According to a third aspect of the present invention, since a small hole is formed in the vicinity of the terminal at a bottom portion of the terminal housing, a circulating environment can be obtained around the terminal, thereby effectively preventing the terminal from corroding.

According to a fourth aspect of the present invention, by using a portion of a terminal inserting hole formed at the bottom portion of the terminal housing, a middle hole which is between both terminals and is formed when the terminal is inserted into the terminal inserting hole becomes a fuel flowing hole, and therefore, processing is easy and manufacturing costs can be reduced.

BRIEF DESCRIPTION OF THE DRAWINGS

Additional objects and advantages of the present invention will be more readily apparent from the following detailed description of preferred embodiments thereof when taken together with the accompanying drawings in which:

FIG. 3 is a view illustrating a construction of a fuel supply system employing the in-tank type fuel pump of the present invention;

DETAILED DESCRIPTION OF THE PRESENTLY PREFERRED EMBODIMENTS

The preferred embodiments of the present invention are hereinafter described with reference to the accompanying drawings.

Figure 1:
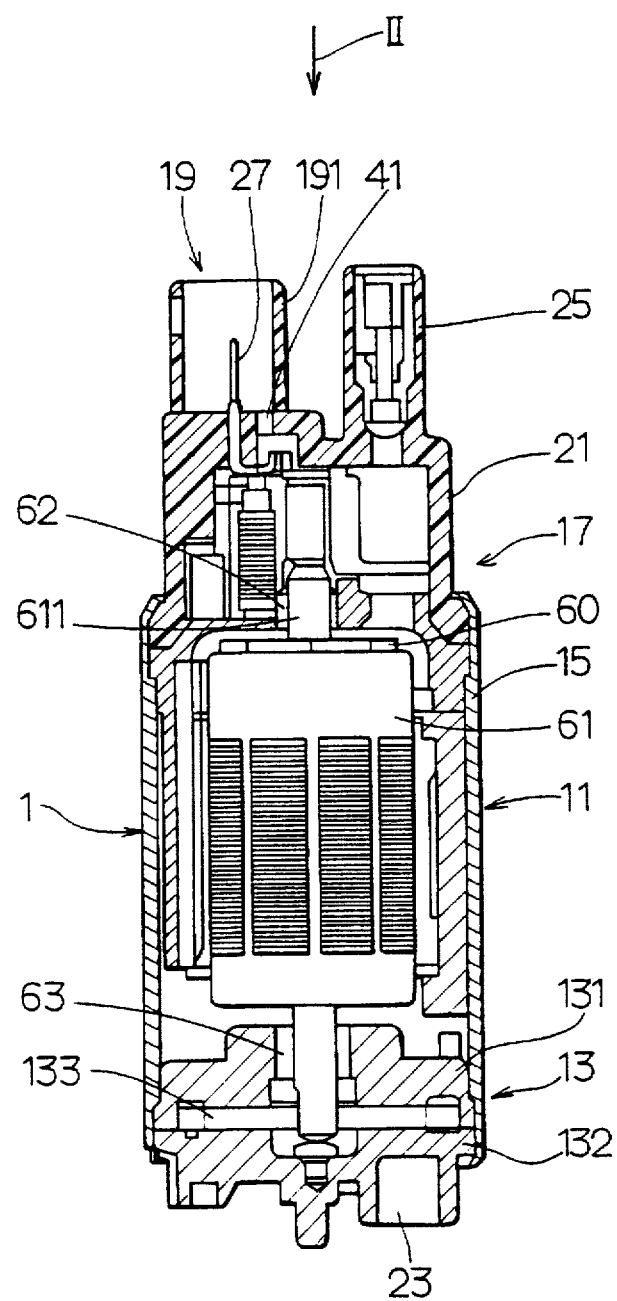
FIG. 1 is a longitudinal cross-sectional view illustrating a fuel pump according to a first embodiment of the present invention.
Figure 2:
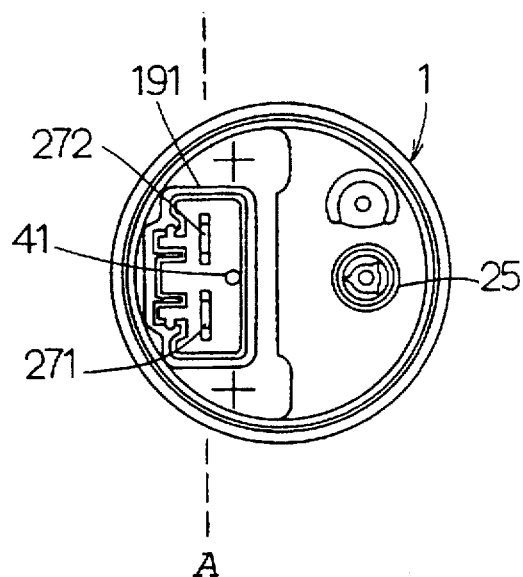
FIG. 2 is a view in the direction of an arrow II in FIG. 1.

A first embodiment in which the present invention is applied to an in-tank type fuel pump is illustrated in FIGS. 1 through 3.

A construction of a fuel supply system employing a fuel pump 1 for an engine of the present invention is explained with reference to FIG. 3. In the first embodiment, the pressure of the discharge from the fuel pump 1 is adjusted by a pressure regulator 51 and the surplus fuel is returned to the fuel tank 3. That is, when an amount of demanded fuel from the internal combustion engine is small, a motor portion 11 of the fuel pump 1 (shown more clearly in FIG. 1) is controlled so that the rotational speed of the motor portion 11 is obtained by adding the rotational speed necessary for providing the demanded fuel amount to the rotational speed necessary for providing a releasing fuel amount corresponding to a release of fuel to the internal portion of the terminal housing from the internal portion of the pump 1 through a small hole or a passage. Therefore, fluid having a large specific gravity such as water and degraded fuel inside an electrical connector 5 can be discharged to an outside of the housing assuredly.

The fuel supply system is constructed by a suction filter 44, the fuel pump 1, a fuel filter 45, a fuel rail 46, the pressure regulator 51 and a plurality of fuel injection valves 47, only one of which is shown in FIG. 3 for clarity. A resin or metallic flange is provided on a top portion of the fuel tank, a resin pump case is suspended from and fixed at a bottom end of the flange inside the fuel tank 3, and the fuel pump 1 is disposed inside the pump case.

The fuel pump 1 is disposed inside the fuel tank 3 and is an in-tank type so that the fuel pump 1 is totally immersed in fuel when the fuel tank 3 is full. The fuel pump 1 has a built-in electric motor 11 and is connected to a battery 7 through the connector 5. The pump 1 has a pump portion 13 and a direct current motor portion 11. The pump portion 13 rotates by receiving a driving force of the motor portion 11 which is driven by driving electric current supplied from an electrical connector unit 19 so that the fuel is pumped by the pump portion 13 from an intake port thereof (connected to fuel suction pipe 23) to an outlet port thereof (connected to an interior of the pump case). A fuel discharging pipe 25 of the fuel pump 1 is connected to a fuel pipe 91 of the fuel supply system as shown in FIG. 3.

As shown in FIG. 3, a fuel filter 45 is connected to a middle portion of the fuel pipe 91 and the fuel pipe 92 is connected to an outlet of the fuel filter 45. The outlet of the fuel pipe 92 is connected to a fuel rail 46. The fuel rail 46 is connected to the plurality of fuel injection valves 47 corresponding to each cylinder of the engine.

The fuel pumped from the fuel tank 3 by the fuel pump 1 is filtered at a fuel filter 44 to remove a foreign substances. The fuel flows is supplied to the fuel rail 46 by passing through the pump housing 15, the fuel discharging pipe 25, the fuel pipe 91, the fuel filter 45, and the fuel pipe 92. Further, the fuel is injected and supplied from the fuel injection valve 47 at a specified timing by a movement of an opening valve of the fuel injection valve 47 which is controlled by an electric signal. Pressure of the fuel rail 46 is adjusted by the pressure regulator 51 and surplus fuel is returned to the fuel tank 3 via the return pipe 93. The pressure regulator 51 is a diaphragm device and fuel adjusting pressure is determined by the difference in pressure between the surge tank 34 of the engine induction system and atmospheric pressure.

As shown in FIGS. 1 and 2, the fuel pump 1 includes a pump housing 15 receiving the motor portion 11 and the pump portion 13 and a pump cover 21 disposed at a top portion of the pump housing 15 and providing a discharging portion 17 and an electrical connector unit 19. A fuel suction pipe 23 and a fuel discharging pipe 25 are also provided. Supplying of electricity to the motor portion 11 is carried out by connecting the electrical connector 5 electrically and mechanically to the terminal 27 protruding inside the electrical connector unit 19. Further, an armature 61 is electrically connected to through a brush (not shown) and a rotating commutator 60 by being in contact with the brush. The commutator 60 has six slots (not shown) in a perpendicular direction relative to its contacting surface with the brush. By dividing the commutator into segments, the slots can provide insulation between the segments. An armature shaft 611 provided at the armature 61 rotates slidably in a shaft bearing 62.

The electrical connector unit 19 is formed integrally with the pump cover 21 and has a square prismatic terminal housing 191 from a view above the fuel tank. A communicating hole 41 as an internal space communicating the motor portion with the atmosphere is formed at a cylindrical bottom portion of the terminal housing 191. The communicating hole 41 is formed on a line passing through a middle position between the terminals 271 and 272 (shown in FIG. 2) in a bottom portion of the terminal housing 191. The communicating hole 41 has a bore small enough so that is does not lose a significant amount of discharge from the fuel pump 1 and has a bore large enough so that the fuel inside the pump 1 in a vicinity of the terminals 271 and 272 can flow through the communicating hole 41. It can be seen that the terminals 271 and 272 are disposed on a common axis A in FIG. 2, and that the communicating hole 41 is disposed off of that common axis.

When the electrical connector 5 is inserted into the electrical connector unit 19 and electricity is supplied to the terminals 271 and 272 from a power source (not shown), the motor portion 11 starts to operate. The fuel is pumped from the fuel tank 3 by rotation of the motor portion 11. The fuel thus pumped flows through the inside of the pump housing 15 through the pump portion 13 from the fuel suction pipe 23 and the majority of the fuel from the pump housing 15 is supplied to the fuel injection valve 47 from the fuel discharging pipe 25 through the fuel pipes 91 and 92 and fuel rail 46. The fuel pumped by the fuel pump 1 fills an internal portion of the motor portion 11 by applying pressure of 2 to 4 kgf/cm$^2$ (approximately 196.133 to 392.266 kPa) to pure fuel which does not include water or the like at the pump portion 13 by a water repellent function of the suction filter 44 installed at the fuel suction pipe 23. The majority of the pressure-applied fuel is discharged to an injector side from the fuel discharging pipe 25; however, some of the pressure-applied fuel is injected into the internal portion of the electrical connector 19 from the communicating hole 41 on the bottom of the electrical connector unit 19. Since the clean fuel is always circulated inside the electrical connector unit 19 by discharging and flowing of the fuel, corrosion of the terminals 271 and 272 can be prevented. The pump portion 13 is formed by sandwiching an impeller 133 between a pump casing 131 and the pump cover 132. The impeller 133 maintains a tiny clearance between the pump casing 131 and the pump cover 132 so that high pressure is appropriately discharged and processing of cutting and processing of removing flash to rotate smoothly are provided.

According to the first embodiment, since the fuel pump 1 is immersed in a fuel such as fuel or the like, the gasoline enters the electrical connector unit 19. Since water and degraded fuel and the like are included in the gasoline, the water, the degraded fuel and the like enter an internal portion of the electrical connector unit 19. When the water and the degraded fuel always stay in the electrical connector unit 19, corrosion of a male terminal (not shown) is produced on the sides of terminals 271 and 272 and electrical connector 5. However, by having the above-described construction, the water and the degraded fuel are discharged from the internal portion of the electrical connector unit 19 to the outside, and therefore, corrosion of the terminals 271 and 272 and the male terminal (not shown) in the side of the electrical connector 5 can be prevented.

The fuel supply system of the engine is explained with reference to FIG. 3.

FIG. 3 is a view illustrating an overall construction of the fuel injection controlling device. In a multiple-cylinder engine 29, a suction pipe 31 is connected to an engine block 30 and a throttle body 33a in which a throttle valve 33 opening and closing by interlocking an applying operation of an accelerator pedal (not shown in FIG. 3) is disposed is connected to an upstream portion of the suction pipe 31. The surge tank 34 is provided on a downstream side of the throttle valve 33 in the suction pipe 31 and fuel injection valves 47 for supplying the fuel to the engine 29 are provided at each cylinder at a downstream portion of the suction pipe 31. Further, an air cleaner (not shown in FIG. 3) is connected to the upstream side of the throttle body 33a. Spark plugs 36 are disposed at each cylinder of a cylinder head 35 of the engine block 30.

(Second Embodiment)

A second embodiment of the present invention illustrates a modification of the communicating hole provided in the vicinity of the terminal of the electrical connector unit of the fuel pump.

Figure 4:
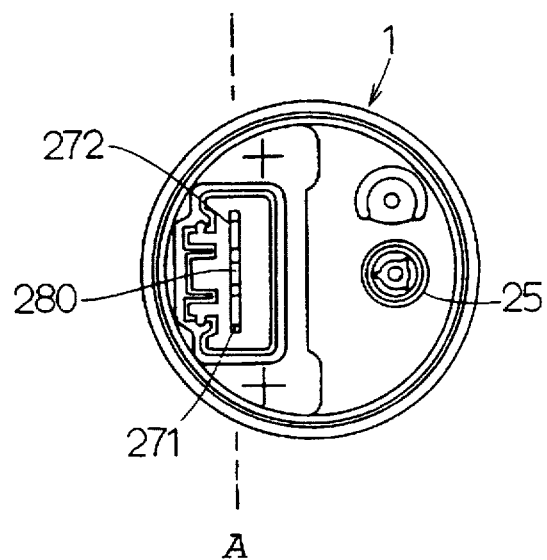
FIG. 4 is a plan view illustrating the in-tank type fuel pump according to a second embodiment of the present invention.

In the second embodiment shown in FIG. 4, by using a terminal inserting hole 280 disposed at a base portion of the electrical connector unit 19 between the terminals 271 and 272, the fuel inside the pump 1 is injected in a vicinity of a terminal base portion inside the connector unit 19.

By using a terminal inserting hole 280 formed at the pump cover 21 for inserting the terminal, a middle space portion of the terminal inserting hole 280 formed at the base portion between the terminals 271 and 272 becomes a hole for flowing the fuel to flow through after inserting the terminal. Since a separate hole actively injecting or supplying the fuel to the vicinity of the terminal does not have to be processed and formed, the terminal inserting hole 280 for inserting the terminal is used and circulation at the vicinity of the terminal base portion becomes satisfactory so that corrosion of the terminals 271 and 272 can be prevented. It can be seen that the terminals 271 and 272 and the terminal inserting hole 280 are disposed on a common axis, A' in FIG. 4.

According to the second embodiment, since processing time is reduced, the pump is manufactured at a low cost and prevents accumulation inside the terminal housing 191 of the electrical connector unit 19, and corrosion of the terminals 271 and 272 can be surely prevented.

(Third Embodiment)

Figure 5:
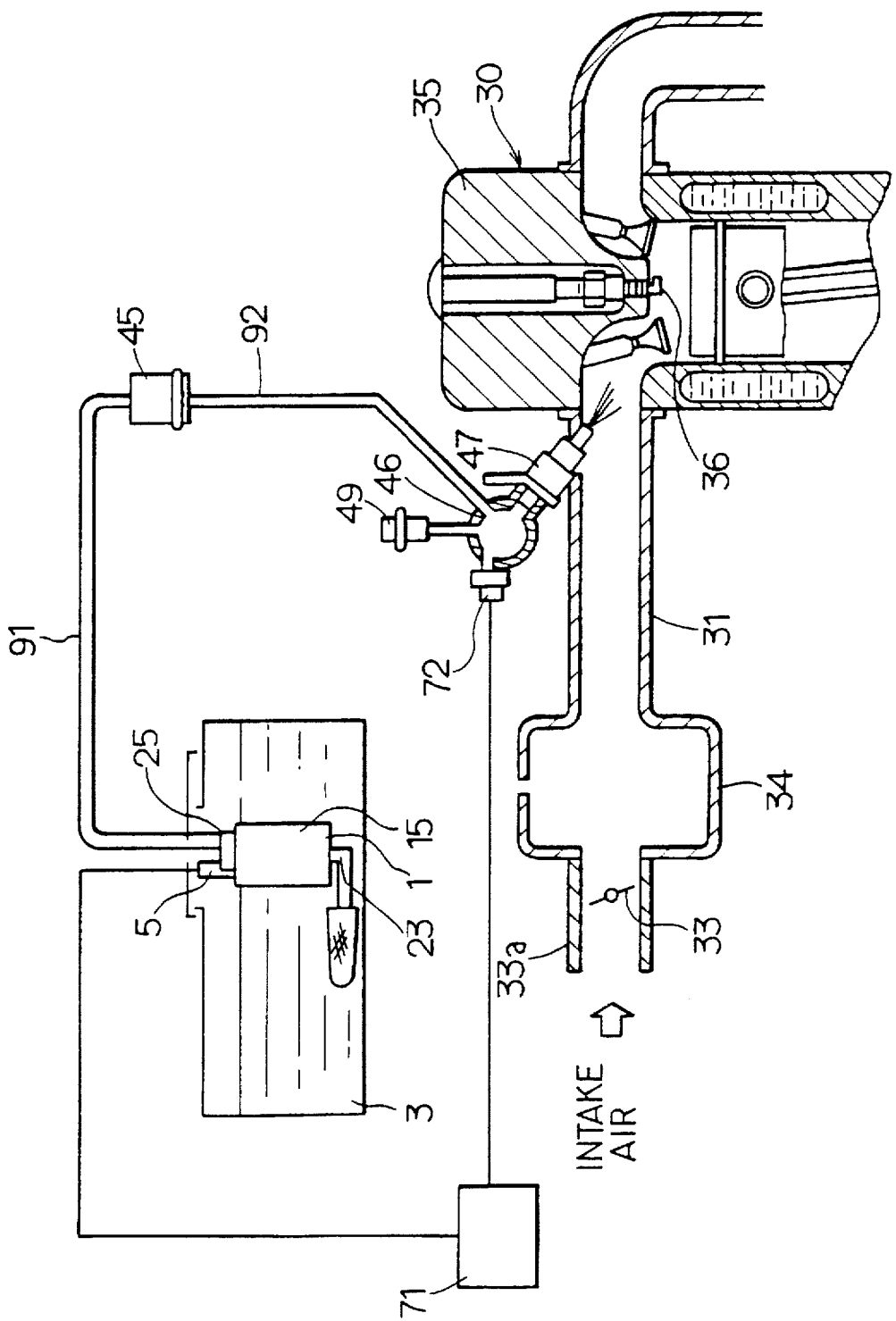
FIG. 5 is a view illustrating a system construction of a fuel system applying an in-tank type fuel pump according to a third embodiment of the present invention.
Figure 6:
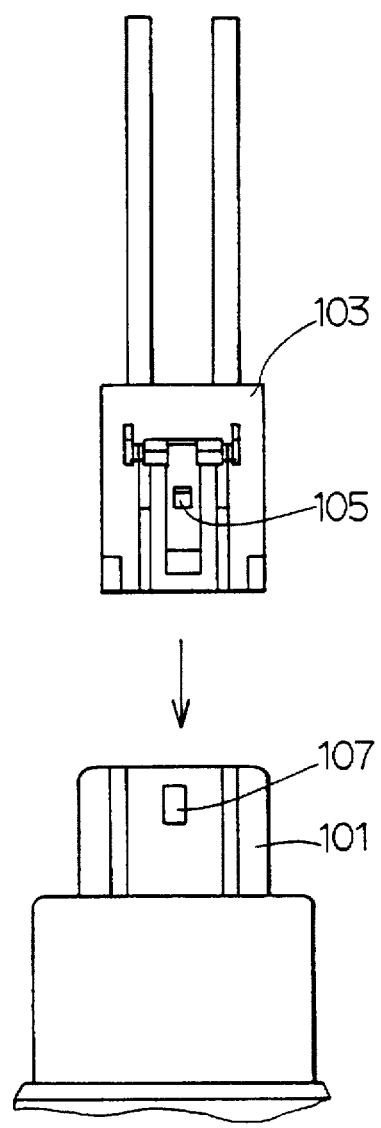
FIG. 6 is a side view illustrating a main portion of a fuel pump according to the prior art.

In a third embodiment according to the present invention as shown in FIG. 5, the present invention is applied to an in-tank type fuel pump obtaining a target combustion pressure by detecting fuel pressure using a pressure sensor 72, processing a signal from the sensor 72 using an electronic control unit (ECU) 71 and controlling the discharging amount of the fuel pump 1 thereby.

A fuel supply route between the fuel pump 1 and fuel injection valve 47 does not have a return passage returning the surplus fuel to the fuel tank 3. This is because fuel pressure discharged from the fuel pump 1 which passes through the fuel pipes 91 and 92 is controlled by using a pulse width modulation (PWM) technique applied to the motor portion 11 of the fuel pump 1. The PWM control is carried out by ECU 71.

The ECU 71 controls the fuel pump 1 by receiving a signal from the pressure sensor 72. The pressure sensor 72 is disposed at the fuel rail 46 on which the fuel injection valve 47 is fixed, the fuel pressure inside the fuel rail 46 is detected and the pressure signal is inputted to the ECU 71 after being replaced with an electric signal.

The ECU 71 compares the fuel pressure inside the fuel rail 46 to a desired pressure and a desired driving electric current is supplied to the terminals 271 and 272 inside the electrical connector unit 19 of the fuel pump 1 as a result of the comparison. Therefore, the fuel pump 1 is controlled and the fuel having the desired pressure is supplied to the fuel injection valve 47 through the fuel filter 45 and the fuel rail 46 by passing it through the fuel discharging pipe 25 from the fuel pipes 91 and 92.

Thus, by applying the present invention to a fuel pump, fuel having large specific gravity such as water, degraded fuel or the like inside the electrical connector can be discharged to the outside assuredly. Further, in the third embodiment, foreign substances such as brush powder, flash powder and the like can be discharged to the outside and can be prevented from entering grooves between adjacent partitions of a commutator 60, thus requiring insulation inside the motor, or from entering a sliding portion between a motor bearing 62 and a shaft 611 and interrupting smooth rotation thereof. The heat produced at the sliding portion between the bearing 62 and the shaft 611 can be cooled down with escaping fuel so that overheating of the motor 11 can be prevented.

In the embodiment shown in FIG. 5, although the fuel pump 1 is controlled by a sensor signal of the pressure sensor 72, the fuel pump 1 may be controlled by a different detection signal.

(Other Embodiment)

Various conditions regarding a position relation of the internal space of the connector unit 19 and the terminal are explained below. These embodiments can be applied to both a system having a return passage returning the surplus fuel to the fuel tank 3 and a system not having the return passage.

Figure 7:
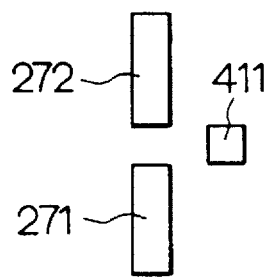
FIG. 7 is a plan view illustrating a position relation between a terminal and an internal chamber according to a fourth embodiment of the present invention.
Figure 8:
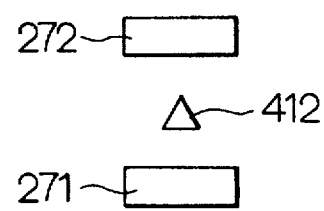
FIG. 8 is a plan view illustrating a position relation between a terminal and an internal chamber according to a fifth embodiment of the present invention.
Figure 9:
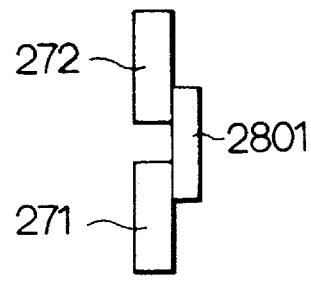
FIG. 9 is a plan view illustrating a position relation between a terminal and an internal chamber according to a sixth embodiment of the present invention.
Figure 10:
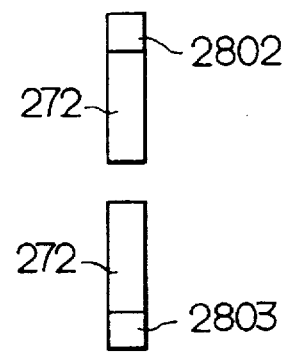
FIG. 10 is a plan view illustrating a position relation between a terminal and an internal chamber according to a seventh embodiment of the present invention.
Figure 11:
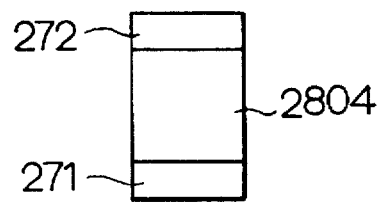
FIG. 11 is a plan view illustrating a position relation between a terminal and an internal chamber according to an eighth embodiment of the present invention.

In a fourth embodiment shown in FIG. 7, an internal space 411 is a four-sided hole. In a fifth embodiment shown in FIG. 8, an internal space 412 is a triangular hole and is provided between the terminals 271 and 272 disposed in parallel. In a sixth embodiment shown in FIG. 9, an internal space 2801 is provided to be in parallel and adjoining the terminals 271 and 272. In a seventh embodiment shown in FIG. 10, both internal spaces 2802 and 2803 are provided on outer sides on the terminals 271,272. In an eighth embodiment shown in FIG. 11, the terminals 271 and 272 are provided in parallel and an internal space 2804 is provided therebetween.

The present invention having been described should not be limited to the disclosed embodiments, but it may be modified in many other ways without departing from the scope and the spirit of the invention. Such changes and modifications are to be understood as being included with the scope of the present invention as defined by the appended claims.

What is claimed is:

1. An in-tank type fuel pump device comprising:

a fuel pump having an intake port and a outlet port;

a pump case, said fuel pump being disposed in an interior of said pump case;

an electrical connector unit having a terminal, electrically connected to said fuel pump, protruding from said pump case; and a terminal housing disposed around said terminal, said terminal housing including a terminal inserting hole for receiving an electrical connector; and a communicating hole connecting an interior of said terminal housing with said outlet port of said fuel pump;

wherein when said pump is disposed in a fuel tank and immersed in fuel therein, a portion of fuel discharged from said outlet port flows through said communicating hole into said terminal housing to displace materials disposed therein.

2. An in-tank type fuel pump device according to claim 1, wherein said fuel pump has a motor portion for controlling an amount of fuel discharged by said pump responsive to a demanded fuel amount from an internal combustion engine.

3. An in-tank type fuel pump device according to claim 1, wherein said communicating hole is different from said terminal inserting hole and is disposed proximate to said terminal inserting hole.

4. An in-tank type fuel pump device according to claim 1, wherein said communicating hole adjoins said terminal inserting hole and said communicating hole is a middle hole between said terminal and an additional terminal electrically connected to said fuel pump.

5. An in-tank type fuel pump device according to claim 1, further comprising:

an additional terminal in said terminal housing and electrically connected to said fuel pump;

wherein said terminals are symmetrically disposed about an axis of said terminal housing and a part of said communicating hole is disposed on said axis.

6. An in-tank type fuel pump device according to claim 5, wherein said terminal and said additional terminal are disposed on a common axis, and said communicating hole is disposed off of said common axis.

7. An in-tank type fuel pump device according to claim 5, wherein said terminal, said additional terminal and said communicating hole are disposed on a common axis.

8. An in-tank type fuel pump device according to claim 5, further comprising an additional communicating hole, said communicating hole and said additional communicating hole each being disposed on a peripheral side of a respective one of said terminals.

* * * * *